United States Patent [19]

Benton

[11] Patent Number: 4,643,041
[45] Date of Patent: Feb. 17, 1987

[54] PRELOADED BALL NUT AND SCREW ASSEMBLY AND METHOD OF MANUFACTURE

[75] Inventor: Robert L. Benton, Bay City, Mich.

[73] Assignee: General Motors Corporation, Detroit, Mich.

[21] Appl. No.: 811,712

[22] Filed: Dec. 20, 1985

[51] Int. Cl.[4] .................. F16H 25/22; F16H 55/18
[52] U.S. Cl. .......................... 74/441; 29/434; 29/446; 74/424.8 R; 74/459; 264/263; 264/268
[58] Field of Search ............... 74/424.8 R, 441, 459; 29/434, 446; 264/263, 268

[56] References Cited

U.S. PATENT DOCUMENTS

| 2,919,596 | 1/1960 | Kuehl | 74/441 |
| 2,982,145 | 5/1961 | Orner | 74/441 X |
| 3,124,969 | 3/1964 | Grabowski et al. | 74/441 |
| 3,125,773 | 3/1964 | Zajac | 74/441 X |
| 3,141,349 | 7/1964 | McDonald | 74/441 |
| 3,234,810 | 2/1966 | Orner | 74/459 |
| 3,372,605 | 3/1968 | Orner | 74/459 |
| 4,004,392 | 1/1977 | Shepard et al. | 264/263 X |

OTHER PUBLICATIONS

Product Engineering, "Eliminating Backlash", Jul.-1939.

Primary Examiner—Allan D. Herrmann
Attorney, Agent, or Firm—Charles R. White

[57] ABSTRACT

A ball nut and screw assembly preadjusted and preloaded by injecting a liquefied pressurized thermoset resin through a mold and into the area between adjacent ball nuts and allowing the thermoset resin to cure and harden while pressurized. After hardening, the mold is removed and the external preload supplied to the resin is maintained by a hardened preload ring formed by the epoxy ring.

5 Claims, 5 Drawing Figures

PRELOADED BALL NUT AND SCREW ASSEMBLY AND METHOD OF MANUFACTURE

This invention relates to a force and motion transfer device and more particularly to a new and improved preloaded ball nut and screw assembly and to a new and improved method of preloading such assemblies.

Various ball nut and screw assemblies utilize a preload between a pair of ball nuts operatively mounted on a ball nut screw to obtain maximum stiffness and to reduce lash or the relative longitudinal shifting of the ball nuts and ball nut screw. An example of a preloaded ball nut and screw assembly is disclosed in U.S. Pat. No. 3,234,810, issued Feb. 15, 1966, issued to H. Orner and entitled "Preloaded Ball Screw and Nut Mechanism". The preloaded ball nut and screw assembly of the present invention is of this general category but further advances the ball nut and screw art by providing consistent preloading of a plurality of ball nut and screw assemblies with parts having a wide tolerance range and by providing a new and unobvious manufacturing method of preloading ball nut and screw assemblies.

The ball nuts of this invention can be manufactured with simple turned down diameters with loose tolerances on interfacing ends of each pair of ball nuts to provide cooperating shoulders that telescopically interfit. The squareness on the interfacing shoulders can also be held to a very loose tolerance and the parts do not require fine finishing as in many of the prior art ball nut and screw constructions. The ball nuts also are provided with a very loose tolerance key and key way. After the ball nuts are assembled on a ball nut screw and loaded into interconnecting ball trains, a key is inserted in a longitudinal key way formed in each ball nut to keep the ball nuts from back driving during the preload operation of this invention. An O-ring or other suitable seal is inserted on a gap side of the preload area formed by the shoulders at the interfacing ends of the ball nuts to prevent a liquefied preload material such as thermoset resin hereinafter described, from flowing from an annular pocket or groove provided radially outwardly of the telescopically interfitted shoulders of the ball nuts onto the ball nut screw. After this O-ring seal is inserted, a fully sealed molding tool is placed around the pocket or groove of the preload area of the two ball nuts. Subsequently, the liquid thermoset resin with a low shrink rate and quick set or cure time is forced through the molding tool and into the annular pocket or groove with a predetermined pressure. The pressurized liquid resin acts on the opposing faces of the ball nuts forming side walls of the annular groove and pushes the ball nuts apart thereby preloading the load bearing components of the ball nut and screw with a predetermined and constant load for each assembly produced. Subsequently, the resin cures into a hardened epoxy ring with the preload forces being effectively transferred from an initial external source to a permanent, internal ring so that the mold can be removed for use on a second ball nut and screw assembly requiring the same or different preload. Accordingly, this invention provides an economical and optimized preload system for quantity production ball nut assemblies with consistently high quality results and without involving parts with closely held tolerances, elaborate preloading and often inconsistent constructions and complex and costly procedures of the prior art assemblies.

These and other features, objects and advantages of this invention will be more apparent from the following detailed description and drawing in which.

Figure 1:
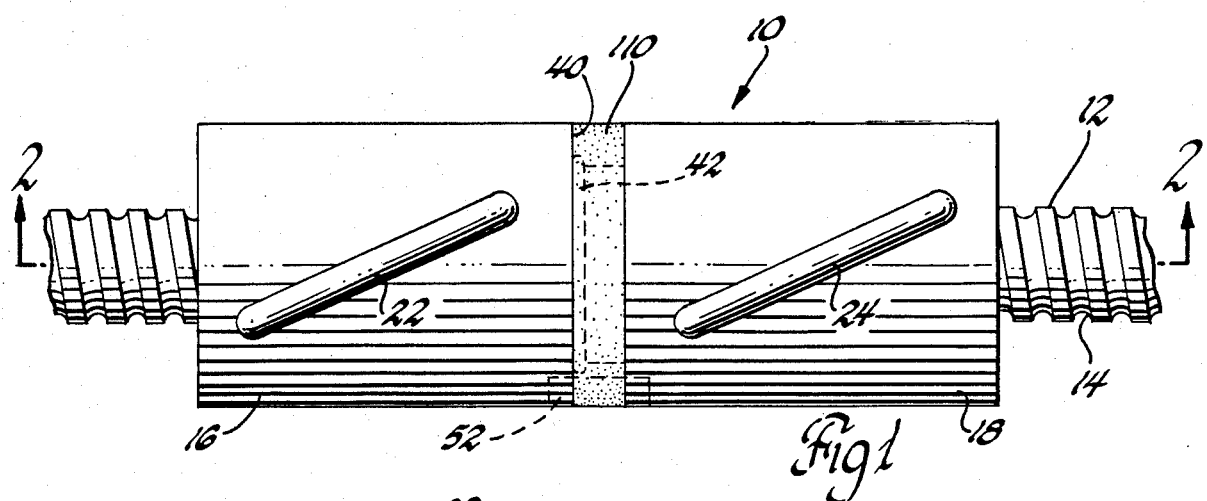
FIG. 1 is a side elevational view of a ball nut and screw assembly according to this invention.

Turning now in greater detail to the drawings, there is shown in FIG. 1 a ball nut and screw assembly 10 having an elongated metallic screw 12 which has an external helical ball groove 14 formed therein. Mounted on this screw are a pair of metallic ball nuts 16 and 18 in a side-by-side relationship. The nuts are equipped with conventional ball return tubes 22, 24 accommodated in conventional openings in the nut to endlessly interconnect the ball tracks provided by the helical grooves 14 of the screw and the complementary helical grooves 26, 28 formed internally of the two nuts. Endless trains of balls 30, 32 operatively interconnecting the respective ball nuts to the ball nut screw for smooth operation with reduced friction as the ball nut and screw are relatively rotated to produce linear motion of one of their elements.

Figure 2:
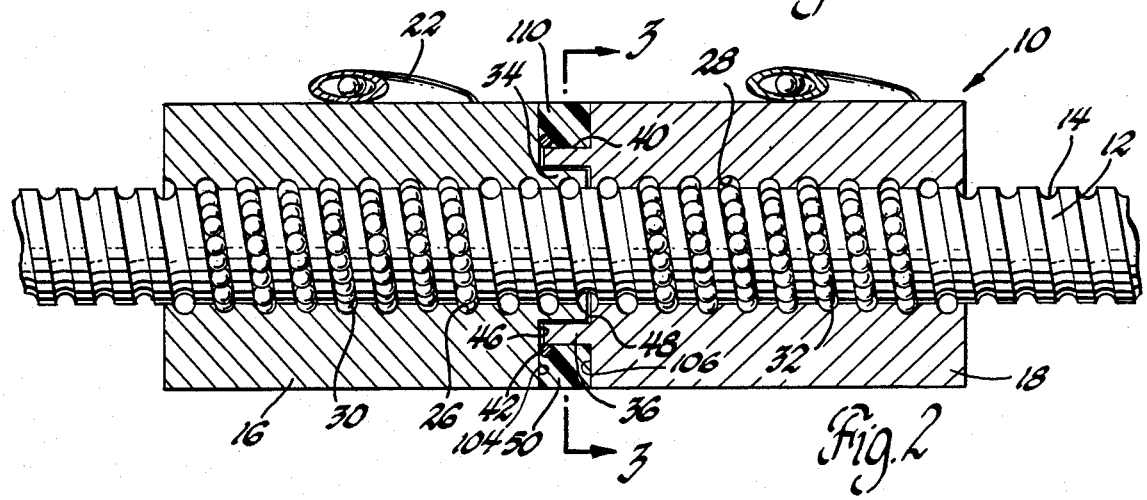
FIG. 2 is a longitudinal cross-sectional view of the ball nut and screw assembly taken along the site lines 2—2 of FIG. 1.
Figure 3:
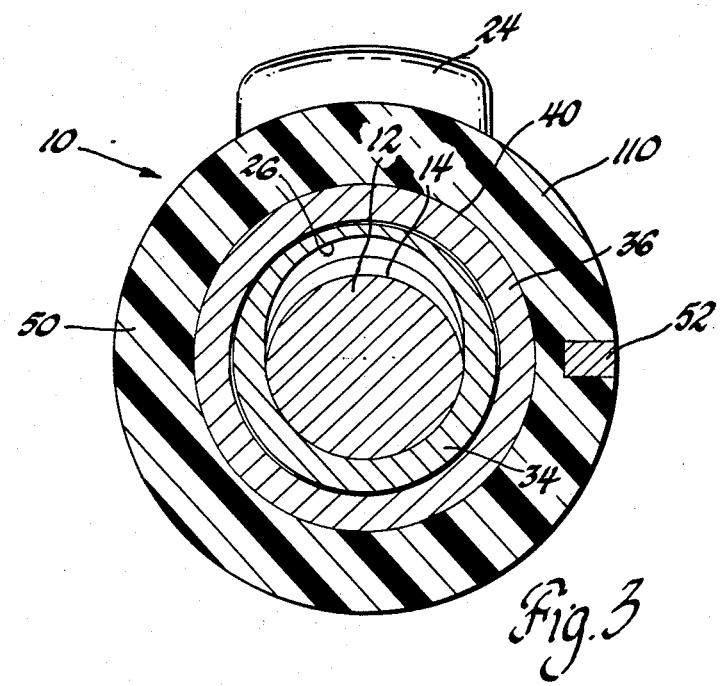
FIG. 3 is a diametrical cross-sectional view taken along site lines 3—3 of FIG. 2.
Figure 4:
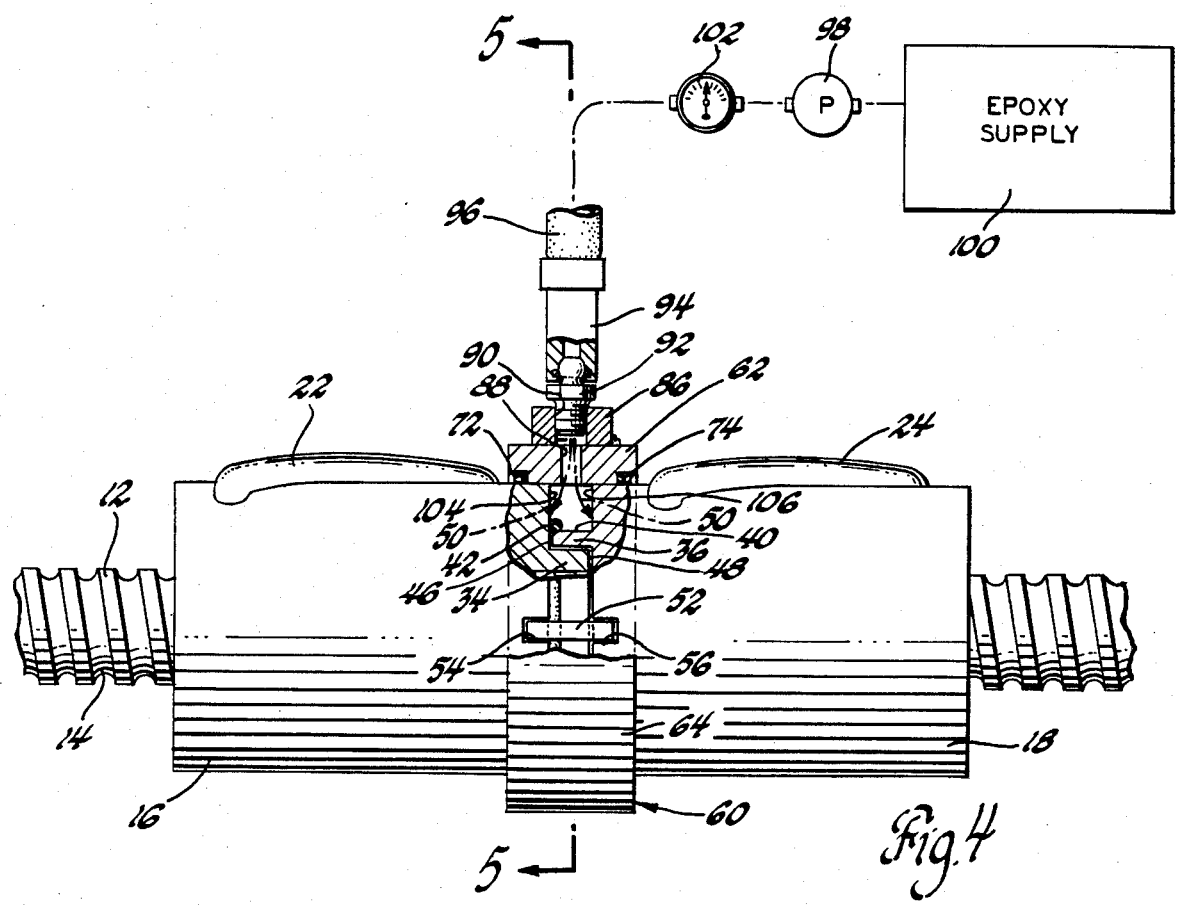
FIG. 4 is an elevational view partly in cross-section of a ball nut and screw assembly of this invention prior to preloading and further illustrates the tooling and method used to provide the preloading of the load bearing components of this invention.

In accordance with the present invention, the interior faces of nuts 16, 18 are respectively formed with projecting shoulders 34, 36 which overlap or telescope on one another as best shown in FIGS. 2 and 4. These shoulders can be readily formed on the ends of the nuts by a lathe or other machine tool and close tolerance machining is not required with the preloading provided by this invention.

When overlapped, the shoulders 34 and 36 form an annular groove or pocket 40 into which an annular O-ring seal 42 is placed. This seal blocks the clearances in the interface between the ball nuts including clearances 46, 48 appearing at the end of the shoulders and the adjacent end faces of the associated ball nut which are allowable tolerance variations in the present invention. After installation of the O-ring seal, a liquefied thermoset resin 50 is injected into the annular groove 40 under predetermined pressure to force the ball nuts apart and load the ball trains and grooves and any other load bearing components to eliminate lash of the ball nut and screw assembly. Before the resin is injected into the annular groove 40, an elongated key 52 is inserted in the aligned key ways 54, 56 formed in the two adjacent ball nuts 16, 18 prior to injection of the thermoset resin to prevent or limit relative rotation of the ball nuts when the pressurized epoxy exerts the parting forces on the ball nuts. This allows the ball nuts to be urged apart for preloading the balls and the helical grooves of the ball nut and screw assembly.

Figure 5:
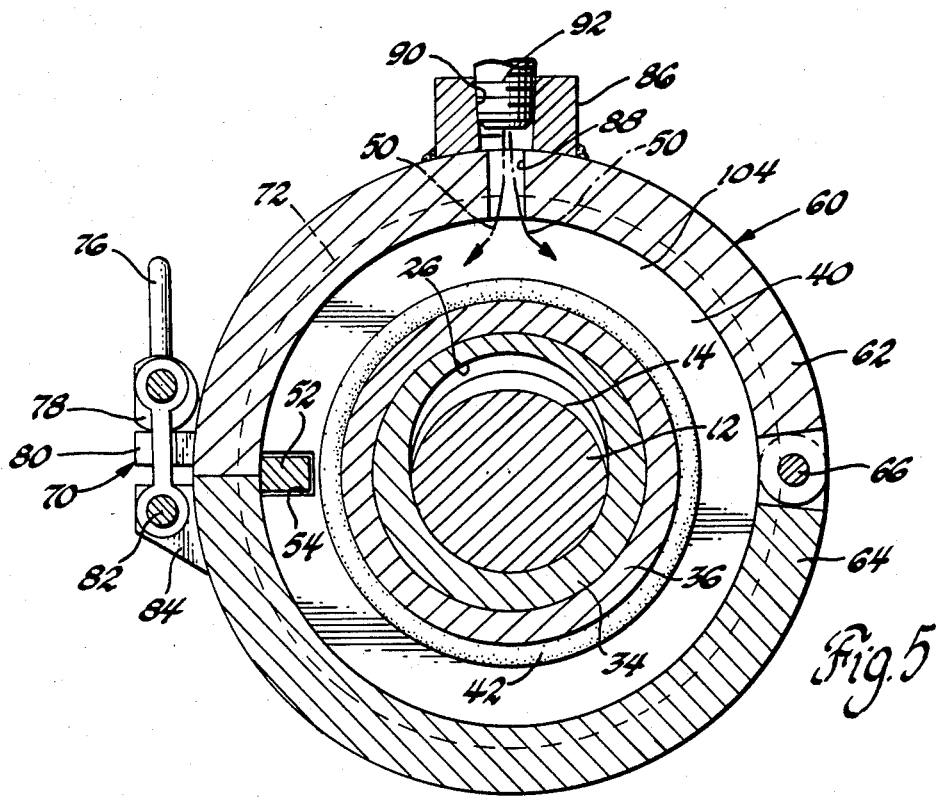
FIG. 5 is a diametrical cross-sectional view taken along lines 5—5 of FIG. 4.

FIGS. 4 and 5 illustrate the molding apparatus used to injection mold the thermoset resin into the assembly. This includes a ring-like annular mold 60 in the form of two semi-circular mold halves 62, 64 hinged together by a hinge 66. Diametrically across from hinge 66, there is a conventional cam lock 70 shown in the locking position. In this position, the cam halves are used to tightly squeeze the mold around the ball nuts with annular seals provided by O-rings 72, 74 being outside of the key and key way and sealingly held against the outer surfaces of the associated ball nuts 16 and 18. In this position, the liquefied resin can be injected into the annular groove 40 for preload purposes. By turning the cam lock handle 76 outwardly 90° from the position illustrated, the attached cam 78 is rocked to a release position with respect to a bifurcated keeper 80 projecting from upper mold half 62. The cam can then be swung on its lower pivot 82 on retainer 84 extending from lower mold half 64 to a released position so that the halves of the mold can be opened after the epoxy has set and preload has been accomplished.

Welded to the top half 62 of the mold is a neck 86 projecting from opening 88 leading into annular groove 40. This neck is internally threaded at 90 to receive a pressure fitting 92 which is like a conventional grease fitting with a one-way ball check valve, not shown, through which liquid epoxy resin is fed into the annular groove 40. This fitting receives the nozzle end 94 of a pressure hose 96 which is connected to a source 100 of thermoset resin by the pressure hose 96. A conventional fluid pump 98 in this feed line pumps the liquid resin from the source 100 into the annular groove 40 at a predetermined pressure which is read from a pressure gauge 102 installed in the line provided by hose 96.

The thermoset resin has a low shrink rate and quick set or cure time and when fed at a predetermined pressure by pump 98 into the mold and groove 40 the ball nuts are pushed in opposite direction by the pressurized epoxy acting on the annular side faces 104, 106 of the groove 40. This preloads the load bearing components of this assembly formed by the trains of balls and the helical grooves or tracks in which these balls operate. If the pressure is increased, the preload is accordingly increased so that any desired preload can be obtained. The liquid resin cannot escape from the mold because of the blocking action of the O-rings 72 and 74 sealed on the outer periphery of the ball nut and because of the fast cure time. Also heat can be applied to increase cure time. The external pressure is maintained until the epoxy resin 50 hardens into an epoxy ring 110 which maintains the preload pressure on the ball nuts. The epoxy also surrounds a portion of key 52 and when hard locks it into position to inhibit relative rotation of the ball nuts. After the epoxy hardens into ring 110, the mold 60 is removed and resin flash is cut away to complete the assembly. A second assembly is made with the same procedure.

Uniform preload from assembly to assembly can be easily obtained by monitoring and regulating the input pressure of the thermoset resin. By using this method, the ball nut preload is very precise due to the ability to regulate the pressure. Since ball nut assemblies are preloaded using the same pressure, the preload would remain constant from assembly to assembly and the finish or squareness of the ball nut ends and other tolerance looseness would not adversely effect the preload. This process, accordingly, results in a much higher quality product while simplifying the machining process of making ball nut hardware.

While a preferred embodiment and method disclosing this invention has been presented by this disclosure, other embodiments and methods in kind will become apparent to those skilled in the art. Accordingly, the scope of this invention is set forth in the following claims.

The embodiments of the invention in which an exclusive property or privilege is claimed are defined as follows:

1. A ball nut and screw assembly preadjusted and preloaded to inhibit lash between the components thereof, said assembly comprising a pair of helically grooved nut means laterally spaced from one another and operatively connected to a helically grooved screw by independent circuits of recirculating balls and held captive in helical tracks formed by the helical grooves in each nut and said screw and including ball return passage means, said nuts having a locking means extending thereacross to inhibit relative rotation of said nut means, liquefied and hardenable plastic means operatively applied a liquid under predetermined pressure in the space between said nuts to initially preload load bearing components of said assembly formed by said circuits of recirculating balls and said tracks and subsequently hardening into a unit to maintain said preload on said load bearing components.

2. A ball nut and screw assembly preadjusted and preloaded to inhibit back lash between the components thereof, said assembly comprising a pair of nut means operatively assembled on and connected to a helically grooved screw by independent circuits of recirculating balls and held captive between each nut and said screw and including ball return passage means, said nuts having interfacing shoulders which telescopically fit with respect to one another and to form an annular groove between said nuts, liquid plastic means held in said groove under pressure so that predetermined axial force is applied to urge said nuts apart to thereby preload the load bearing components of said assembly, said liquid plastic means being subsequently hardened into a form operatively disposed between said ball nuts to maintain said preload pressure.

3. A preloaded ball nut and screw assembly produced by the steps of forming a ball nut screw with an external helical ball path therein, forming a pair of ball nuts each with an internal helical ball path therein which cooperates with ball path of the screw to make a helical ball track interconnecting the helical ball path to make the ball track endless, forming interfacing and overlapping shoulders on the ball nuts which telescopically fit over one another and with clearance therebetween and form an annular groove between said ball nuts, inserting ball trains in said tracks, installing of a mold around said ball nuts around said annular groove, injecting a liquid plastic material into said mold under a predetermined pressure to thereby urge said ball nuts in opposite directions to preload the ball and the helical grooves formed by the ball nut and screw, allowing said plastic material to cure and harden to maintain said preload and subsequently removing said mold from said ball nuts to complete said ball nut and screw assembly.

4. A method of preloading ball nut and screw assemblies with constant pressure, each assembly having first and second ball nut halves mounted on an elongated ball nut screw and operatively connected thereto by endless trains of balls recirculating in a helical ball track interconnecting by a crossover passage means, each of said ball nut halves having overlapping shoulder portions comprising the steps of operatively placing the ball nuts on said screw so that said shoulder portions overlap and define an annular groove therebetween, injecting a liquefied plastic material therebetween under a predetermined pressure so that equal and opposite forces are exerted on said ball nut halves to preload said assembly, allowing said plastic material to cure while said pressure is maintained thereby maintaining said preload and removing said mold from said assembly.

5. The method defined in claim 4 wherein seal means are placed between said overlapping shoulder portions to prevent the escape of liquefied plastics material from said annular groove.

* * * * *